(12) United States Patent
Smith

(10) Patent No.: US 10,927,299 B1
(45) Date of Patent: Feb. 23, 2021

(54) PRESERVATIVE SYSTEM

(71) Applicant: HauteHerbotique, LLC, Evanston, IL (US)

(72) Inventor: Marlene M. Smith, Evanston, IL (US)

(73) Assignee: HauteHerbotique, LLC, Evanston, IL (US)

( * ) Notice: Subject to any disclaimer, the term of this patent is extended or adjusted under 35 U.S.C. 154(b) by 0 days.

(21) Appl. No.: 16/393,424

(22) Filed: Apr. 24, 2019

(51) Int. Cl.
*C09K 15/34* (2006.01)
*C09K 15/06* (2006.01)

(52) U.S. Cl.
CPC .............. *C09K 15/34* (2013.01); *C09K 15/06* (2013.01)

(58) Field of Classification Search
CPC ................................ C09K 15/34; C09K 15/06
See application file for complete search history.

(56) References Cited

U.S. PATENT DOCUMENTS 6,379,652 B1 * 4/2002 Liu .......................... A61K 8/37
424/49
2010/0297198 A1 * 11/2010 Kim ....................... A61K 8/345
424/401

FOREIGN PATENT DOCUMENTS

CN 107519050 A * 12/2017

OTHER PUBLICATIONS

Tongnuanchan et al. (J. of Food Science 79(7) 2014).*

* cited by examiner

*Primary Examiner* — Shirley V Gembeh
(74) *Attorney, Agent, or Firm* — Fay Sharpe LLP

(57) ABSTRACT

The present disclosure relates to a formulation for a non-hazardous, organic preservative system. The preservative system comprises water, an alcohol, xylitol, and lemon grass essential oil in quantities which ensure preservative qualities without compromising the compound or substance that is being preserved.

11 Claims, No Drawings

PRESERVATIVE SYSTEM

BACKGROUND

The present disclosure relates to compositions for use as preservatives. A preservative system that is non-hazardous, organic, and exhibits preservative qualities is desirable.

BRIEF DESCRIPTION

Disclosed, in various embodiments, are non-hazardous, organic preservative compositions.

In embodiments disclosed herein, the preservative composition comprises an alcohol, xylitol, and an essential oil. The preservative system may further comprise water.

The volume ratio of the alcohol to xylitol may be from about 2:1 to about 9:1, or in particular embodiments about 4.8:1. The volume ratio of the alcohol to the essential oil may be from about 7:1 to about 28:1, or in particular embodiments about 14.4:1. The volume ratio of xylitol to the essential oil may be from about 2:1 to about 6:1, or in particular embodiments about 3:1. The volume ratio of water to the alcohol may be from about 3:1 to about 1:1. The volume ratio of water to the alcohol to xylitol to essential oil may be, in particular embodiments, about 21.6:14.4:3:1.

The essential oil can be one of: basil essential oil, bay leaf essential oil, cinnamon essential oil, eucalyptus essential oil, guava essential oil, oregano essential oil, rosemary essential oil, spearmint essential oil, tea tree essential oil, thyme essential oil, or lemon grass essential oil. In particular embodiments, the essential oil is lemon grass essential oil.

These and other non-limiting characteristics are more particularly described below.

DETAILED DESCRIPTION

The singular forms "a," "an," and "the" include plural referents unless the context clearly dictates otherwise.

As used in the specification and in the claims, the terms "comprise(s)," "include(s)," "having," "has," "can," "contain(s)," and variants thereof, as used herein, are intended to be open-ended transitional phrases, terms, or words that require the presence of the named ingredients and permit the presence of other ingredients. However, such description should be construed as also describing compositions or processes as "consisting of" and "consisting essentially of" the enumerated ingredients, which allows the presence of only the named ingredients, along with any unavoidable impurities that might result therefrom, and excludes other ingredients.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

A value modified by a term or terms, such as "about" and "substantially," may not be limited to the precise value specified. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number.

The present disclosure relates to preservative systems. The components of the preservative system are an alcohol, xylitol, and an essential oil. The preservative system can also include water.

The alcohol may be any suitable primary, secondary, or tertiary alcohol. Examples of alcohols may include methanol, ethanol, n-propyl alcohol, isopropyl alcohol, n-butyl alcohol, and tert-butyl alcohol. In particular embodiments, the alcohol is ethanol.

The xylitol can be provided in either powder or liquid form. Xylitol is a 5-carbon sugar that has anti-fungal and anti-microbial properties because it cannot be easily metabolized by fungi/bacteria. Salts and other forms of xylitol (e.g. the monoester) are contemplated as falling within the scope of this disclosure.

Suitable essential oils include essential oils of basil, bay leaf, cinnamon, eucalyptus, guava, oregano, rosemary, spearmint, tea tree, thyme, lemon grass (also known as cymbopogon), or combinations thereof. In particular embodiments, lemon grass essential oil is used. A small amount of essential oil is used, ranging from 15 to 25 drops (gtts) per 2.5 teaspoons of the preservative system. One milliliter is approximately equal to 15 to 20 drops.

The volume ratio of the alcohol to xylitol may be from about 2:1 to about 9:1. In particular embodiments, the volume ratio of the alcohol to xylitol is about 4.8:1. The volume ratio of the alcohol to the essential oil may be from about 7:1 to about 28:1. In particular embodiments, the volume ratio of the alcohol to the essential oil is about 14.4:1. The volume ratio of xylitol to the essential oil may be from about 2:1 to about 6:1. In particular embodiments, the volume ratio of xylitol to the essential oil is about 3:1.

When water is present, the volume ratio of water to the alcohol may be from about 3:1 to about 1:1. In particular embodiments, the water and the alcohol are added together in the form of vodka, which contains ethanol and is typically 40% alcohol by volume (ABV). The water and the alcohol together generally provide from about 60 vol % to about 90 vol % of the system.

The volume ratio of water to alcohol to xylitol to essential oil may be, in particular embodiments, about 21.6:14.4:3:1. Put another way, the amount of essential oil is very small relative to the amount of water, the alcohol, and xylitol.

Any combination of these volume ratios is contemplated to be within the scope of this disclosure. The volume ratio of the constituent ingredients helps in maintaining preservative qualities while ensuring that the preservative system does not dilute, alter, or compromise the compound or substance it is preserving.

The following example is provided to illustrate the composition of the present disclosure. The example is merely illustrative and is not intended to limit the disclosure to the materials, conditions, or process parameters set forth therein.

Example 1

The following ingredients were combined to make the preservative system: 2 tablespoons of vodka (80 proof); ½ teaspoon of xylitol powder; and 20 drops (gtts) lemon grass essential oil.

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A preservative system, comprising:
   an alcohol;
   xylitol; and
   an essential oil;
   wherein:
   (A) the volume ratio of the alcohol to xylitol is from about 2:1 to about 9:1; or
   (B) the volume ratio of the alcohol to the essential oil is from about 7:1 to about 28:1; or
   (C) the volume ratio of xylitol to the essential oil is from about 2:1 to about 6:1.

2. The system of claim 1, wherein the volume ratio of the alcohol to xylitol is about 4.8:1.

3. The system of claim 1, wherein the volume ratio of the alcohol to the essential oil is about 14.4:1.

4. The system of claim 1, wherein the volume ratio of xylitol to the essential oil is about 3:1.

5. The system of claim 1, wherein the essential oil is one of: basil essential oil, bay leaf essential oil, cinnamon essential oil, eucalyptus essential oil, guava essential oil, oregano essential oil, rosemary essential oil, spearmint essential oil, tea tree essential oil, thyme essential oil, or lemon grass essential oil.

6. The system of claim 1, wherein the essential oil is lemon grass essential oil.

7. The system of claim 1, wherein the alcohol is ethanol.

8. A preservative system, comprising an alcohol, xylitol, an essential oil, and water, wherein the volume ratio of water to alcohol to xylitol to essential oil is about 21.6:14.4:3:1.

9. The system of claim 8, wherein the essential oil is lemon grass essential oil.

10. The system of claim 8, consisting essentially of the water, ethanol, xylitol, and essential oil.

11. A method for making a preservative system, comprising combining vodka, xylitol, and an essential oil, wherein:
   (A) the volume ratio of the alcohol to xylitol is from about 2:1 to about 9:1; or
   (B) the volume ratio of the alcohol to the essential oil is from about 7:1 to about 28:1; or
   (C) the volume ratio of xylitol to the essential oil is from about 2:1 to about 6:1.

* * * * *